(12) United States Patent
Hirata et al.

(10) Patent No.: US 6,971,627 B2
(45) Date of Patent: Dec. 6, 2005

(54) SOLENOID VALVE

(75) Inventors: Ichiro Hirata, Fujisawa (JP); Norio Uemura, Fujisawa (JP); Yoshinari Kasagi, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/362,372

(22) PCT Filed: Aug. 24, 2001

(86) PCT No.: PCT/JP01/07282

§ 371 (c)(1),
(2), (4) Date: Aug. 18, 2003

(87) PCT Pub. No.: WO02/18828

PCT Pub. Date: Mar. 7, 2002

(65) Prior Publication Data

US 2004/0011982 A1 Jan. 22, 2004

(30) Foreign Application Priority Data

Aug. 28, 2000 (JP) .............................. 2000-257804

(51) Int. Cl.⁷ .............................................. B65B 1/04
(52) U.S. Cl. .............................................. 251/129.07
(58) Field of Search ................... 251/129.07, 129.2, 251/129.21

(56) References Cited

U.S. PATENT DOCUMENTS 4,313,571 A * 2/1982 Bellicardi et al. ........ 239/585.5
4,946,132 A    8/1990 Reiter ........................ 251/129

FOREIGN PATENT DOCUMENTS

| DE | 3904447 A1 | 8/1990 |
| DE | 3933331 A1 | 4/1991 |
| JP | 54-139321 | 9/1979 |
| JP | 57-141278 | 9/1982 |
| JP | 6-137453 | 5/1994 |
| JP | 10-196829 | 7/1998 |
| JP | 2000-46227 | 2/2000 |

* cited by examiner

Primary Examiner—Steven O. Douglas
(74) Attorney, Agent, or Firm—Jacobson Holman PLLC

(57) ABSTRACT

A solenoid valve appropriately used for pressure control of various fluids, or the like is concerned, and a solenoid valve is provided, which achieves improvement in sliding property of a plunger and is excellent in control characteristics. More specifically, a plunger 1 is substantially cylindrical-shaped and slidably supported at its outer peripheral side by a sleeve, the plunger being provided with a large-diameter portion 1a, which constitutes a sliding portion, the large-diameter portion 1a being alternately provided with a plurality of convex surface portions 1d and a plurality of groove portions 1e and having a cross sectional shape like petals.

2 Claims, 7 Drawing Sheets

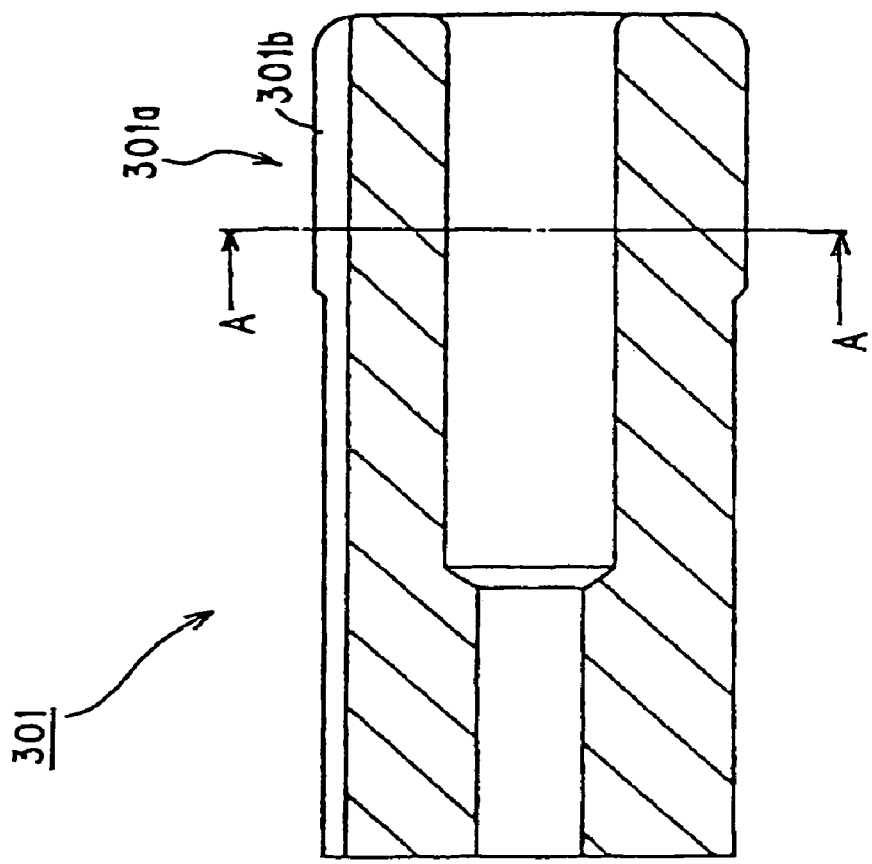
FIG. 7 (A) PRIOR ART
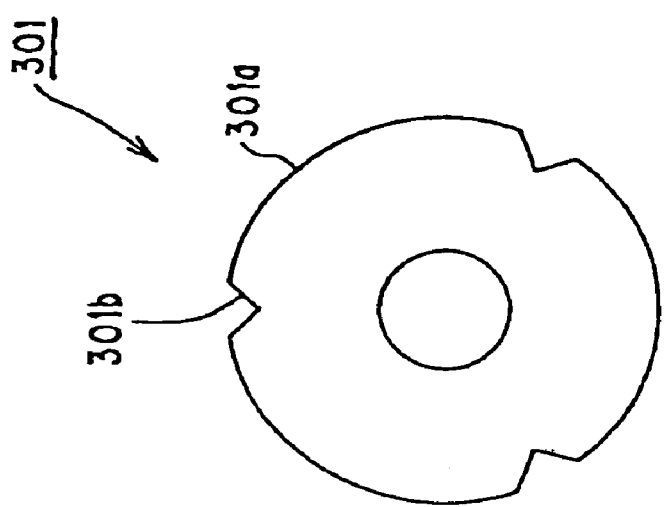
FIG. 7 (B) PRIOR ART

SOLENOID VALVE

This is a nationalization of PCT/JP01/07282 filed Aug. 24, 2001 and published in Japanese.

TECHNICAL FIELD

The present invention relates to a solenoid valve used suitably for pressure control of various fluids or the like.

BACKGROUND ART

Conventionally, a solenoid valve of this type is shown in, for example, FIG. 8. FIG. 8 is a cross sectional view showing a schematic construction of a solenoid valve of the conventional art.

A solenoid valve 200 comprises a solenoid section 200A and a valve section 200B.

Here, the valve section 200B comprises a spool valve constructed such that since an opening area of the valve is varied according to a stroke of a spool, a solenoid controls a stroke amount of the spool to be able to control an amount of inflow and an amount of outflow.

The solenoid section 200A generally comprises a coil 203, a plunger 201 adapted to be magnetically attracted by a center post 202 upon energization of the coil 203, and a rod 204 connected to the plunger 201 to transmit driving of the plunger 201 to the valve section 200B (concretely, the spool).

Also, provided are a first bearing 205 and a second bearing 210 for increasing a coaxiality of the plunger 201 and the rod 204, which reciprocate, a sleeve 206 supporting the plunger 201 and so on, an upper plate 207 and a lower plate 209, which form a magnetic path, a casing 208, and the like.

Here, the plunger 201 is configured to be positioned in a direction away from the center post 202 in a normal state, that is, a state, in which electricity is not fed to the coil 203.

In addition, generally, a biasing member such as springs, or the like, biases the plunger 201 in a direction away from the center post 202. In an example shown, a spring for biasing the spool toward the solenoid section 200A is provided whereby the plunger is spaced away from the center post 202 through the spool.

So, electricity is fed to the coil 203 to thereby form a magnetic path, so that the plunger 201 is magnetically attracted by the center post 202.

Accordingly, magnetic forces can be controlled according to a magnitude of current fed to the coil 203, so that an amount of movement of the plunger 201 is controlled by controlling balancing associated with the biasing member such as springs, or the like, whereby it is possible to control an amount of stroke of the spool, thus enabling controlling a flow rate of a fluid, pressure control, such as hydraulic control, of various fluids, or the like.

Here, coaxiality is cited as a fundamental performance generally required for solenoid valves. The reason for this is that with an inadequate coaxiality, a plunger and a rod repeatedly reciprocate obliquely to an axis whereby local abrasion, in which abrasion is partly caused, is generated to lead to degradation in control characteristics, such as hysteresis, in which a change in characteristics is produced between outward way and homeward way, deviation of magnetic flux toward a plunger, or the like.

Such coaxiality is determined by sizing of respective members, and the more members related to centering, the more propagation of an error due to dimensional tolerances of the respective members.

With the solenoid valve 200 shown in FIG. 8, members related to centering include those members, which abut directly against, or indirectly support the plunger 201, the center post 202, and the rod 204, and so nine members comprising the plunger 201, center post 202, and the rod 204 themselves, the first bearing 205, second bearing 210, sleeve 206, upper plate 207, lower plate 209, and the casing 208.

Accordingly, since dimensions of the nine members must be strictly managed, a burden for enhancing accuracy in coaxiality is significant.

Hereupon, in order to lighten such burden, a construction has been developed, in which a sleeve supporting a plunger serves as bearings for the plunger itself for reduction of the number of members related to centering.

While a detailed description is omitted, the members related to centering in this case include five members, that is, a plunger, rod, center post, sleeve, and a rod bearing, so that a burden in dimensional management decreases and it is possible to attain improvement in coaxiality.

Also, since the need of bearing structures on both end sides of a plunger as in the arrangement shown in FIG. 8 is obviated, there is produced an advantage that miniaturization can be achieved in an axial direction.

With the solenoid valve thus constructed, it is required that a plunger be excellent in sliding quality relative to an inner periphery of a sleeve, which serves as a bearing, in order to perform smooth and stable reciprocating motions, and flow passages (oil passages, or the like) be provided on an outer peripheral surface of the plunger so as to eliminate pressure load on both end sides in an axial direction and provide a high sliding quality.

This will be described with reference to FIG. 7. FIG. 7 shows schematic, cross sectional views of a configuration of a plunger according to the conventional art ((A) is a cross sectional view as cut through an axis, and (B) is a cross sectional view as cut in a direction perpendicular to the axis (AA cross section in (A) and corresponding to a whole part).

As shown in the figure, a plunger 301 of the conventional art is substantially cylindrical-shaped to comprise a large-diameter portion 301a, which slides on an inner periphery of a sleeve, and a groove 301b serving as a flow passage is formed by cutting.

Thus, the inner periphery of the sleeve and the plunger 301 slide relative to each other while curved surfaces of substantially the same diameter contact with each other, and a liquid (oil) flows in by way of the flow passage, so that it is not subjected to pressure load and sliding is effected while given lubrication by the liquid, thereby it is enabled reciprocating motions suitably.

Since there is a need of providing a predetermined clearance between an inner peripheral diameter of the sleeve and an outer peripheral diameter of the plunger in order to perform a smooth sliding, the plunger is not actually reciprocated while being kept completely coaxial with the sleeve, but the large-diameter portion 301a of the plunger and an inner periphery 302 of the sleeve slide while contacting with each other at one point in a cross section perpendicular to an axis.

In the case of the conventional art, however, there is caused the following problem.

As described above, since the plunger slides relative to the sleeve while contacting with each other at one point in a cross section perpendicular to the axis, there is involved a disadvantage that load at the time of sliding is liable to makes a burden great and a property of sliding abrasion is made worse.

Also, since the outer diameter of the plunger and the inner peripheral diameter of the sleeve are of substantially the same dimension, a gap in the vicinity of slide portions is very narrow to cause a problem that when foreign matters (impurities) enter, they remain to be caught in, thereby making the sliding property worse.

An object of the invention is to provide a solenoid valve, which is intended for improvement in sliding property of a plunger and excellent in control characteristics.

DISCLOSURE OF THE INVENTION

To attain the object, the invention provides a solenoid valve comprising a plunger for reciprocation by means of magnetic forces produced by excitation means, and a sleeve slidably supporting an outer periphery of the plunger to bear the same, and wherein the sleeve is provided with an inner peripheral wall surface for the bearing, the inner peripheral wall surface being perpendicular to an axis and circular-shaped in cross section, and the plunger comprises on an outer periphery thereof a plurality of convex surface portions in the form of a curved surface, which has a smaller radius of curvature than a distance between the axis and a surface of the outer periphery, the convex surface portions sliding on the inner peripheral wall surface and extending in an axial direction, and a plurality of grooves each provided between adjacent convex surface portions and forming an axially extending flow passage.

Accordingly, since a curved surface having a smaller radius of curvature than a distance between the axis and a surface of the outer periphery, that is, a curved surface having a smaller radius of curvature than a diameter of the inner periphery of the sleeve effects sliding, two adjacent convex surface portions effect sliding for the reason that sliding with only one convex surface portion is unstable. That is, sliding is effected not at one point as in the conventional art but at two points in a cross section perpendicular to an axis. Thereby, since a load is dispersed in two-point contact as compared with one-point contact, sliding abrasion is decreased.

Also, since a curved surface having a smaller radius of curvature than a diameter of the inner periphery of the sleeve effects sliding, gaps near the sliding portions can be made comparatively large to make entry of a fluid easy, so that the lubricating property is made good and in the case where foreign matters enter, they become easy to escape into the flow passages.

Preferably, the convex surface portions are distributed equally in a circumferential direction and provided in an odd number of locations.

Accordingly, since the convex surface portions and the groove portions are disposed in a positional relationship that is symmetrical with an axis interposed therebetween, an outer peripheral surface on an opposite side in a middle position (groove portion) between the two convex surface portions with an axis therebetween is made furthest from the inner periphery of the sleeve in a state, in which adjacent convex surface portions effect sliding, and the portions constitute the convex surface portions whereby backlash can be suppressed.

Preferably, cross sections of flow passages formed by the grooves and the inner peripheral wall surface to be perpendicular to the axis are set to dimensions and a shape to cover dimensions and a shape of a mesh of a filter, by which impurities contained in a fluid flowing into a body of the solenoid valve are removed outside the body of the solenoid valve before inflowing.

Accordingly, a size of impurities contained in a fluid flowing into a body of the solenoid valve is restricted by the filter to a size, which is permitted to pass through the mesh of the filter. Since cross sections of the flow passages are dimensioned and shaped to cover dimensions and a shape of the mesh of the filter, plugging of impurities in the flow passages is obviated.

Preferably, the convex surface portions and the grooves provided on the outer periphery of the plunger are obtained by die forging, the plunger is provided on an end surface, which is opposed in a direction of pressurization at the time of die forging, with an inwardly recessed recess, and a bottom surface of the recess constitutes that portion, which is pressed by an ejector pin in order that a plunger body is taken out from a forging die after the die forging.

Accordingly, even if burr is generated on that portion (portion being pressed), which is pressed by an ejector pin when a plunger body is pushed out from a forging die by the ejector pin, burr is generated only at a bottom surface of the recess, so that an entire length of the plunger is not affected thereby.

Also, the invention provides a solenoid valve comprising a plunger for reciprocation by means of magnetic forces produced by excitation means, and a sleeve slidably supporting an outer periphery of the plunger to bear the same, and wherein the sleeve is provided with an inner peripheral wall surface for the bearing, the inner peripheral wall surface being perpendicular to an axis and circular-shaped in cross section, and a portion of the plunger sliding on the inner peripheral wall surface has a cross section perpendicular to an axial direction and having an outer peripheral shape of a polygon.

Here, "polygon" includes the case where respective corners assume a R-shape,

With the configuration, the inner peripheral wall surface of the sleeve having a circular-shaped cross section slidably supports the plunger having a cross section, of which an outer peripheral shape is polygonal. Accordingly, since the plunger is made unstable when sliding only at one corner, sliding is effected at two adjacent corners. That is, sliding is effected not at one point as in the prior art but at two points in a cross section perpendicular to an axis. Thereby, since a load is dispersed in two-point contact as compared with one-point contact, sliding abrasion is decreased.

Also, since sliding is effected at corners, gaps near the sliding portions can be made comparatively large to make entry of a fluid easy, so that the lubricating property is made good and in the case where foreign matters enter, they become easy to escape into the flow passages.

Preferably, the outer peripheral shape is a polygon having an odd number of vertices. In particular, the outer peripheral shape is preferably a substantially regular nonagon.

Accordingly, the corners and the planar surface portions on the outer periphery of the plunger are put in a positional relationship that is symmetrical with respect to an axis, so that it is possible to reduce backlash. Also, flow passages formed by the planar surface portions on the outer periphery of the plunger and the inner peripheral wall surface of the sleeve can be set to an appropriate magnitude in cross sectional area in the case where taking account of balancing between feeding of a magnetic path and discharge of foreign matters. In the case of cutting a plunger, planar surface portions of the plunger are chucked. It is preferable to effect three-point chucking, in which case it is necessary to make the outer peripheral shape a polygon (regular polygon), which has vertices being a multiple of 3 in number, and a regular nonagon preferably meets such condition.

Preferably, cross sections of flow passages formed by planar portions on the outer periphery of the plunger and the inner peripheral wall surface of the sleeve to be perpendicular to the axial direction are set to dimensions and a shape to cover dimensions and a shape of a mesh of a filter, by which impurities contained in a fluid flowing into a body of the solenoid valve are removed outside the body of the solenoid valve before inflowing.

Accordingly, a size of impurities contained in a fluid flowing into a body of the solenoid valve is restricted to a size, which is permitted to pass through the mesh of the filter. Since cross sections of the flow passages are dimensioned and shaped to cover dimensions and a shape of the mesh of the filter, plugging of impurities in the flow passages is obviated.

BRIEF DESCRIPTION OF THE DRAWINGS

FIG. 7 are schematic, cross sectional views of a configuration of a plunger according to the conventional art.

BEST MODE FOR CARRYING OUT THE INVENTION

Preferred embodiments of the invention will be exemplarily described below in detail with reference to the drawings. However, a scope of the invention is not to be limited only to dimensions, materials, configurations, and relative positions of constituent parts described in the embodiments unless otherwise specifically described.

(First Embodiment)

A solenoid valve according to a first embodiment of the invention will be explained with reference to FIGS. 1 to 5.

Figure 1:
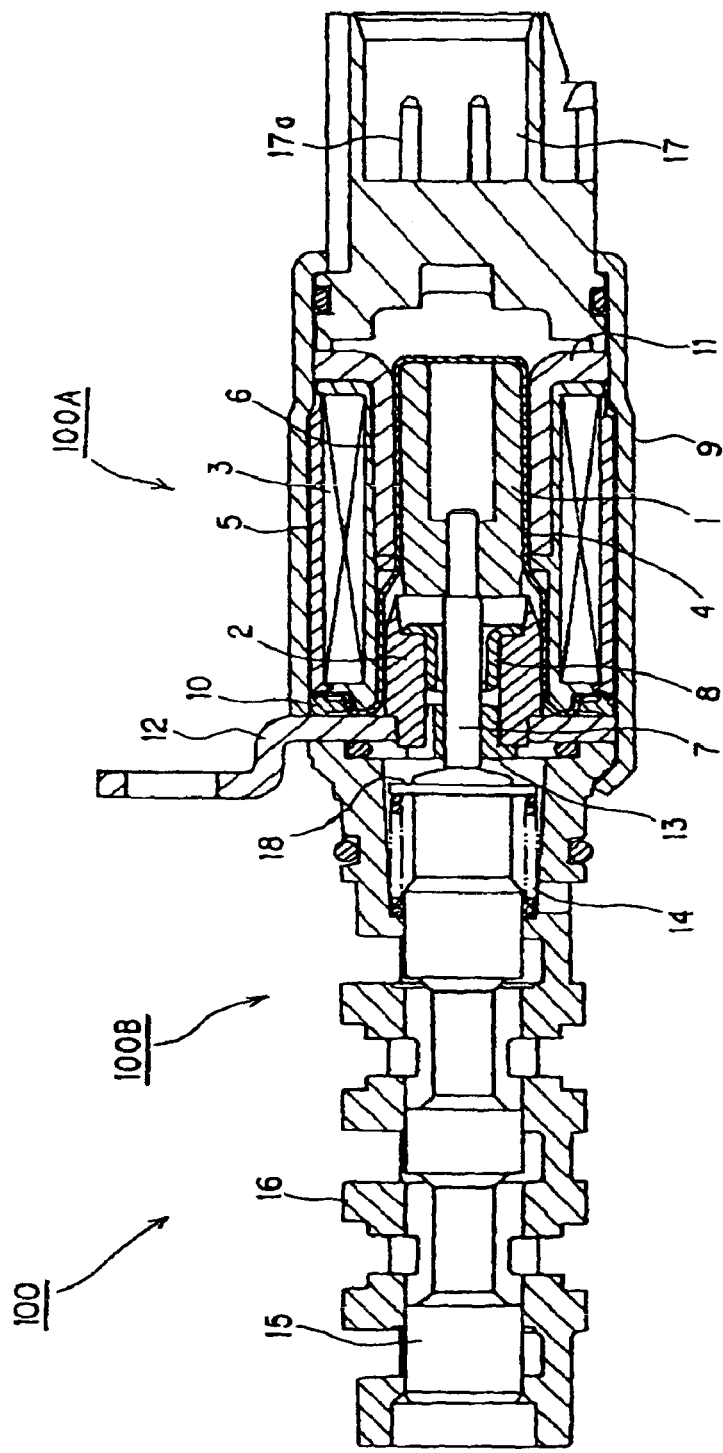
FIG. 1 is a schematic, cross sectional view showing a constitution of a solenoid valve according to an embodiment of the invention.
Figure 2:
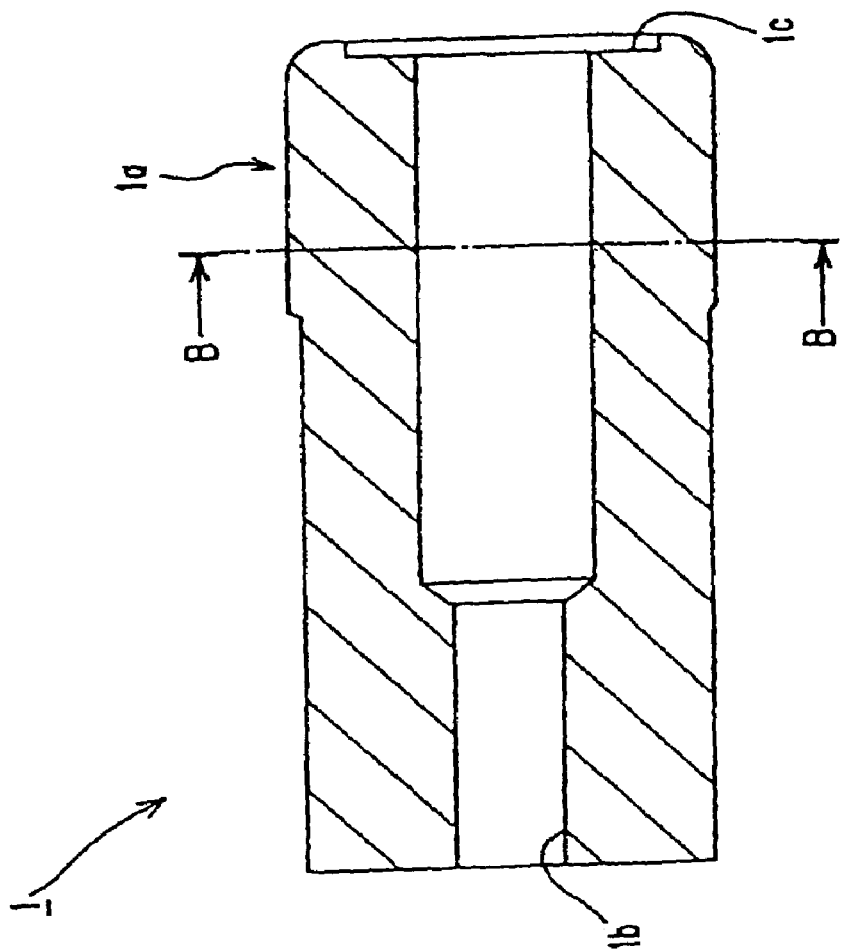
FIG. 2 are schematic, cross sectional views of a configuration of a plunger according to a first embodiment of the invention.
Figure 2:
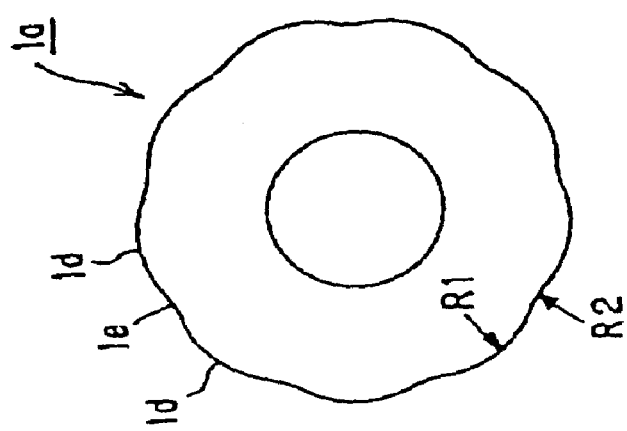
Figure 3:
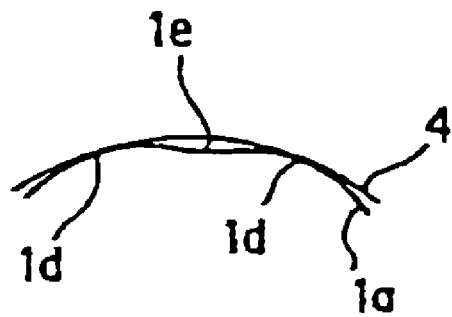
FIG. 3 is a diagrammatic view showing a state of sliding portions between a plunger and an inner periphery of a sleeve.
Figure 3:
Figure 4:
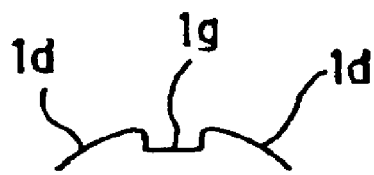
FIG. 4 is a diagrammatic view showing a configurational example of a groove provided on the plunger.
Figure 4:
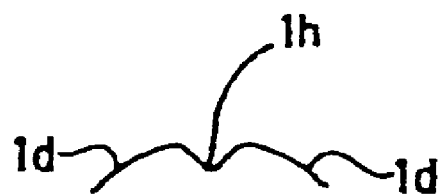
Figure 5:
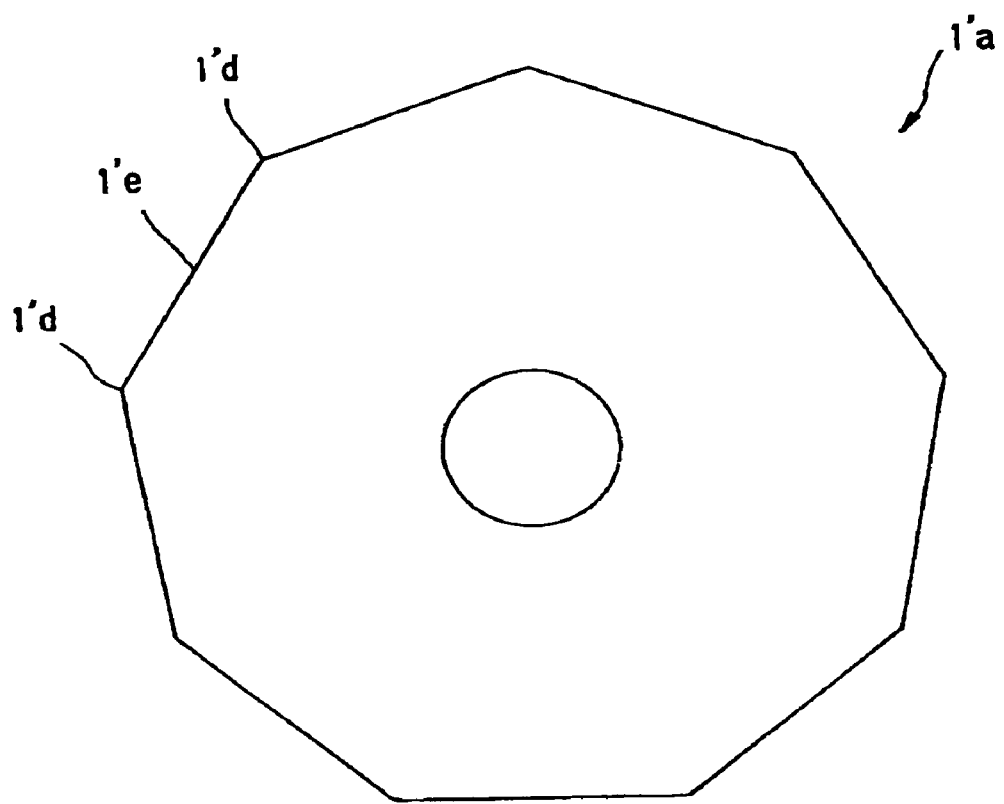
FIG. 5 is a schematic, cross sectional view showing a plunger according to a second embodiment of the invention.

FIG. 1 is a schematic, cross sectional view showing a constitution of a solenoid valve according to the embodiment of the invention. FIG. 2 shows schematic, cross sectional views of a configuration of a plunger according to the first embodiment of the invention ((A) is a cross sectional view as cut through an axis, and (B) is a cross sectional view as cut in a direction perpendicular to the axis (BB cross section in (A) and corresponding to a whole part). FIG. 3 is a diagrammatic view showing a state of a plunger and an inner periphery of a sleeve. FIG. 4 shows a configurational example of a groove provided on the plunger. FIG. 5 is a diagrammatic view showing a part of the manufacturing process of a plunger according to embodiments of the invention.

A solenoid valve 100 comprises a solenoid section 100A and a valve section 100B.

Here, the valve section 100B comprises a spool valve constructed such that a spool 15 is provided in a valve sleeve 16 to be able to reciprocate therein and since an opening area of a valve formed in the valve sleeve 16 is varied according to a stroke of the spool 15, a solenoid controls a stroke amount of the spool 15 to be able to control an amount of inflow and an amount of outflow.

The solenoid section 100A generally comprises a coil 3, a plunger 1 adapted to be magnetically attracted by a center post 2 upon energization of the coil 3, a sleeve 4 serving as a bearing for the plunger 1, and a rod 7 connected to the plunger 1 to transmit driving of the plunger 1 to the spool 15.

Also, provided are a bobbin 6, around which the coil 3 is wound, a shim 8 for facilitating separation of the plunger 1 from the center post 2, a casing 9, a packing 10 for preventing leakage of a fluid to a side of the coil 3 from an interior of the valve section 100B, an upper plate 11, which forms a magnetic path, and a bracket plate 12, which also forms a magnetic path and serves to fix a solenoid valve body in a predetermined position.

Further, provided are a bearing 13 for the rod 7, a spring 14 for biasing an E-type ring 18 fixed to the spool 15 to thereby bias the plunger 1 in a direction away from the center post 2 through the rod 7 together with the spool 15, and a connector 17 provided with terminals 17a for feeding of electricity to the coil 3.

In addition, the coil 3 and the bobbin 6 are molded to be assembled (Assy) to constitute a mold coil sub-Assy 5.

Here, the plunger 1 is configured to be positioned in a direction away from the center post 2 in a normal state, that is, a state, in which electricity is not fed to the coil 3, that is, the spring 14 in the embodiment biases the spool 15 in a direction toward the solenoid section 100A through the E-type ring 18 whereby the plunger 1 is separated from the center post 2.

So, electricity is fed to the coil 3 to thereby form a magnetic path (a magnetic path formed by the casing 9, upper plate 11, plunger 1, center post 2, and the bracket plate 12), so that the plunger 1 is magnetically attracted by the center post 2.

Accordingly, magnetic forces can be controlled according to a magnitude of current fed to the coil 3, so that an amount of movement of the plunger 1 is controlled by controlling balancing associated with a biasing force produced by the spring 14, whereby it is possible to control an amount of stroke of the spool 15, thus enabling controlling a flow rate of a fluid, pressure control, such as hydraulic control, of various fluids, or the like.

Here, since the plunger 1 is born by the sleeve 4 in the embodiment, members related to centering include five members, that is, the plunger 1, rod 7, center post 2, sleeve 4, and the rod bearing 13, a burden in dimensional management is comparatively small and it is possible to attain improvement in coaxiality.

Also, since the need of bearing structures on both end sides of the plunger 1 is obviated, there is produced an advantage that miniaturization can be achieved in an axial direction.

Subsequently, a further detailed explanation will be given to the plunger 1.

The plunger 1 is substantially cylindrical-shaped to permit the rod 7 to be fitted into a hole 1b on an inner peripheral side thereof and to have an outer peripheral side thereof slidably supported by the sleeve 4 as described above, thus a large-diameter portion 1*a*, which constitutes a slide portion, being provided.

The large-diameter portion 1*a* comprises a plurality of convex surface portions 1*d* and a plurality of groove portions 1*e*, as shown in FIG. 2(B), these portions being provided alternately, and has a cross sectional shape like that of petals.

The convex surface portions lid extend axially, and distances between tip ends (most distant from an axis) of the respective convex surface portions 1*d* and then axis are set to be the same.

Further, the convex surface portions 1*d* assume a shape of a smooth curved surface, and a radius of curvature of outer peripheral, curved surfaces in a cross section perpendicular to the axis is set to be smaller than distances between the tip ends of the convex surface portions 1*d* and the axis. Thereby, distances between the tip ends of the convex surface portions 1*d* and the axis are smaller by an amount of a clearance than an inner peripheral diameter of the sleeve 4, so that the radius of curvature of the outer peripheral, curved surfaces becomes naturally smaller than the inner peripheral diameter of the sleeve 4.

For example, it is assumed that distances between the tip ends of the convex surface portions 1*d* and the axis are 5 mm and a radius of curvature in the vicinity of the tip ends of the convex surface portions 1*d* is 3 mm. In addition, the inner periphery of the sleeve 4 has a radius larger by an amount of a clearance than 5 mm.

The tip ends of the convex surface portions 1*d* are disposed slidably on the inner peripheral surface of the sleeve 4.

The axially extending groove portions 1*e*, respectively, are provided between the adjacent convex surface portions 1*d*, and flow passages are defined between the groove portions 1*e* and the inner peripheral surface of the sleeve 4.

In the case where the plunger 1 slides on the inner periphery of the sleeve 4 in the solenoid valve 100 constructed in the above manner, the plunger 1 is not reciprocated while being kept completely coaxial with the sleeve 4, since there is provided a clearance for smooth sliding, as described with respect to the conventional art.

With the embodiment, a radius of curvature (outer peripheral diameter) of the slide surface portions is not substantially the same as a radius of curvature (inner peripheral diameter) of the inner peripheral surface of the sleeve unlike the conventional art and a radius of curvature of the convex surface portions 1*d*, which constitute the slide surface portions, is smaller than a radius of curvature (inner peripheral diameter) of the sleeve 4, so that a very unstable sliding only at one point in a cross section perpendicular to an axis is not actually effected, and the adjacent convex surface portions 1*d* perform sliding while contacting at two points as shown in FIG. 3(A).

Accordingly, load is dispersed as compared with the case of contact at one point in a cross section perpendicular to an axis as in the conventional art, and a burden of load on the sliding portions is reduced, so that a property of sliding abrasion is improved.

Also, like the conventional art, the curved surfaces slide on each other while contacting with each other and a liquid (oil) flows in by way of flow passages, so that it is not subjected to pressure load, and sliding is effected while given lubrication by the liquid; thereby it is enabled reciprocating motions suitably.

Also, with the embodiment, a radius of curvature of the convex surface portions 1*d* is smaller than a radius of curvature (inner peripheral diameter) of the sleeve 4, and so a fluid easily flows onto the sliding portions from flow passages formed by the groove portions 1*e* to make lubrication excellent as compared with the conventional art, thus improving the sliding property.

Further, a radius of curvature of the convex surface portions 1*d* is smaller than a radius of curvature (inner peripheral diameter) of the sleeve 4, and gaps in the vicinity of the sliding portions are large as compared with the conventional art, so that even when foreign matters (impurities) enter in the vicinity of the sliding portions, foreign matters easily escape into flow passages, thus enabling preventing that degradation in the sliding property, which is caused by the foreign matters.

In this manner, the plunger is improved in sliding property, so that fluid controllability such as hydraulic control, or the like, is improved.

An explanation will be given below to a preferred, concrete example.

It is preferable that the convex surface portions 1*d* be distributed equally in a circumferential direction and provided in an odd number of locations.

Thus, being distributed equally and provided in an odd number of locations, the convex surface portions 1*d* and the groove portions 1*e* are disposed in a positional relationship that is symmetrical with an axis interposed therebetween (see FIG. 2(B)).

Accordingly, the plunger 1 slides with the adjacent convex surface portions 1*d* making contact at two points and an outer peripheral surface opposed to the groove portion 1*e* in a middle position between the two points with an axis therebetween is made furthest from an inner periphery of the sleeve, so that such portion is made a convex surface portion 1*d* whereby there is produced an effect of making the gap as small as possible to suppress backlash.

Also, while FIG. 2(B) shows an example, in which the groove portions 1*e* have a curved surface connected smoothly to the convex surface portions 1*d* and having a radius of curvature R2 equal to a radius of curvature R1 of the convex surface portions 1*d*, the groove portions are not limited thereto but may be rectangular-shaped groove portions 1*g* shown in FIG. 4(A), or triangular-shaped groove portions 1*h* shown in FIG. 4(B).

Here, it is desired that a cross section of flow passages perpendicular to an axis defined by the groove portions 1*e* and an inner periphery of the sleeve 4 be dimensioned and shaped in such a manner to prevent impurities contained in a fluid flowing through the flow passages from being caught.

In the case where, for example, a filter for removal of impurities contained in a fluid is installed in a flow passage for introducing the fluid into the solenoid valve 100 in order to meet the desire, only impurities smaller than a mesh of the filter are contained in a fluid flowing into the solenoid valve 100.

Accordingly, dimensions and a shape of a cross section of the flow passages perpendicular to an axis are made to cover dimensions and a shape of a mesh of the filter whereby it is possible to prevent impurities from being caught and plugged in the flow passages defined by the groove portions 1*e* and the inner periphery of the sleeve 4.

Accordingly, it is possible to maintain a stable sliding property.

Subsequently, an explanation will be give to a preferred example of application of the solenoid valve 100 according to the embodiment.

In engines of automobiles or the like, in which cam shafts are rotated to open and close air supply and exhaust valves of the engine, it is possible to enhance fuel efficiency and obtain a high exhaust gas purification by appropriately controlling timing of the valves according to an operating state (high speed/low speed).

Such control of valve timing can be performed by shifting cam shafts in a direction of rotation for phase change, and a technique of performing such shifting with solenoid valves has been known as a known technique.

Here, hydraulic control with the use of solenoid valves is performed to shift cam shafts in a direction of rotation, and it is common that the a solenoid valve is mounted on a path of a flow passage for an engine oil in terms of an installation space, or the like, and an engine oil is made use of.

Conventionally, a solenoid valve for performing on-off control is used to perform control by two states at high speed and at low speed. In recent years, solenoid valves capable of linear control have been used to perform a highly precise control.

Here, it becomes possible to preferably use the solenoid valve according to the embodiment of the invention as such linear control solenoid valve for valve timing control (VTC).

Hereupon, in the case of making use of an engine oil as described above, foreign matters such as iron powder, or the like are largely contained in an engine oil and so a fluid in a comparatively bad condition is used. Since the solenoid valve according to the embodiment permits foreign matters to flow into the flow passages to be excellent in sliding property, it can be preferably made use of even under such bad condition.

Subsequently, an explanation will be give to a method of manufacturing a plunger 1, which constitutes the solenoid valve 100 according to the embodiment, with reference to FIG. 6.

The plurality of convex surface portions 1$d$ and the plurality of groove portions 1$e$ on the large-diameter portion 1$a$ of the plunger 1 can be fabricated in die forging by clamping with forging dies 50, 51 and pressurization in a direction indicated by an arrow P in the figure. In addition, the forging die 51 is indicated by dotted lines for the explanation of subsequent manufacturing processes.

Also, 1$f$ in the figure denotes a portion being cut in a cutting process after the die forging.

Here, in order to take out a body of the plunger 1 from the die after the die forging is carried out, it is necessary to use an ejector pin 52 to press (strike) an end surface on an opposite side in the direction of the arrow P after the forging die 51 is removed.

Here, the plunger according to the embodiment is provided, on the end surface thereof on the opposite side in the direction of the arrow P, with a recess 1$c$, which is recessed inwardly of a tip end surface, and a bottom surface of the recess 1$c$ serves as a portion being pressed by the ejector pin 52.

Figure 6:
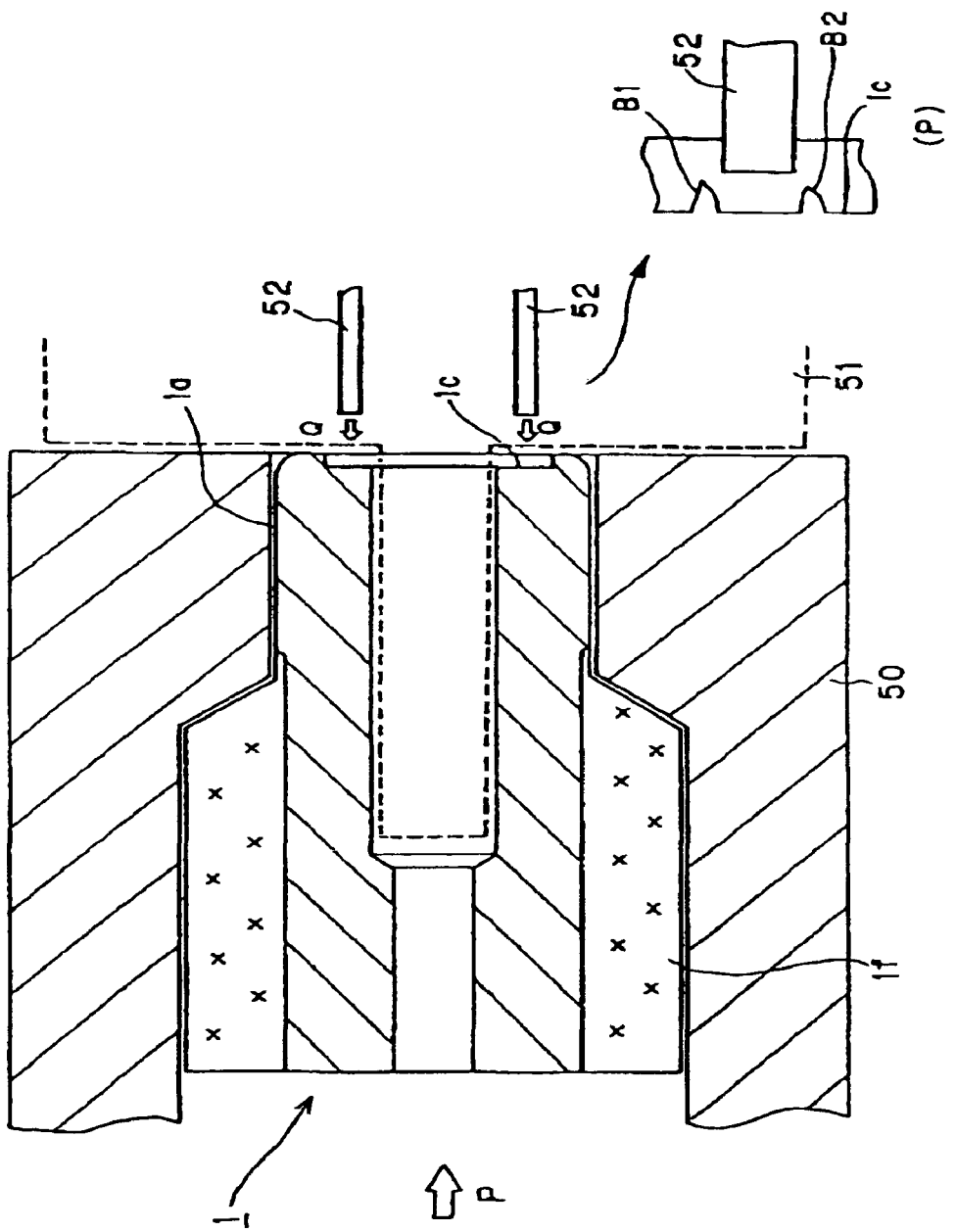
FIG. 6 is a diagrammatic view showing a part of the manufacturing process of a plunger according to embodiments of the invention.
Figure 8:
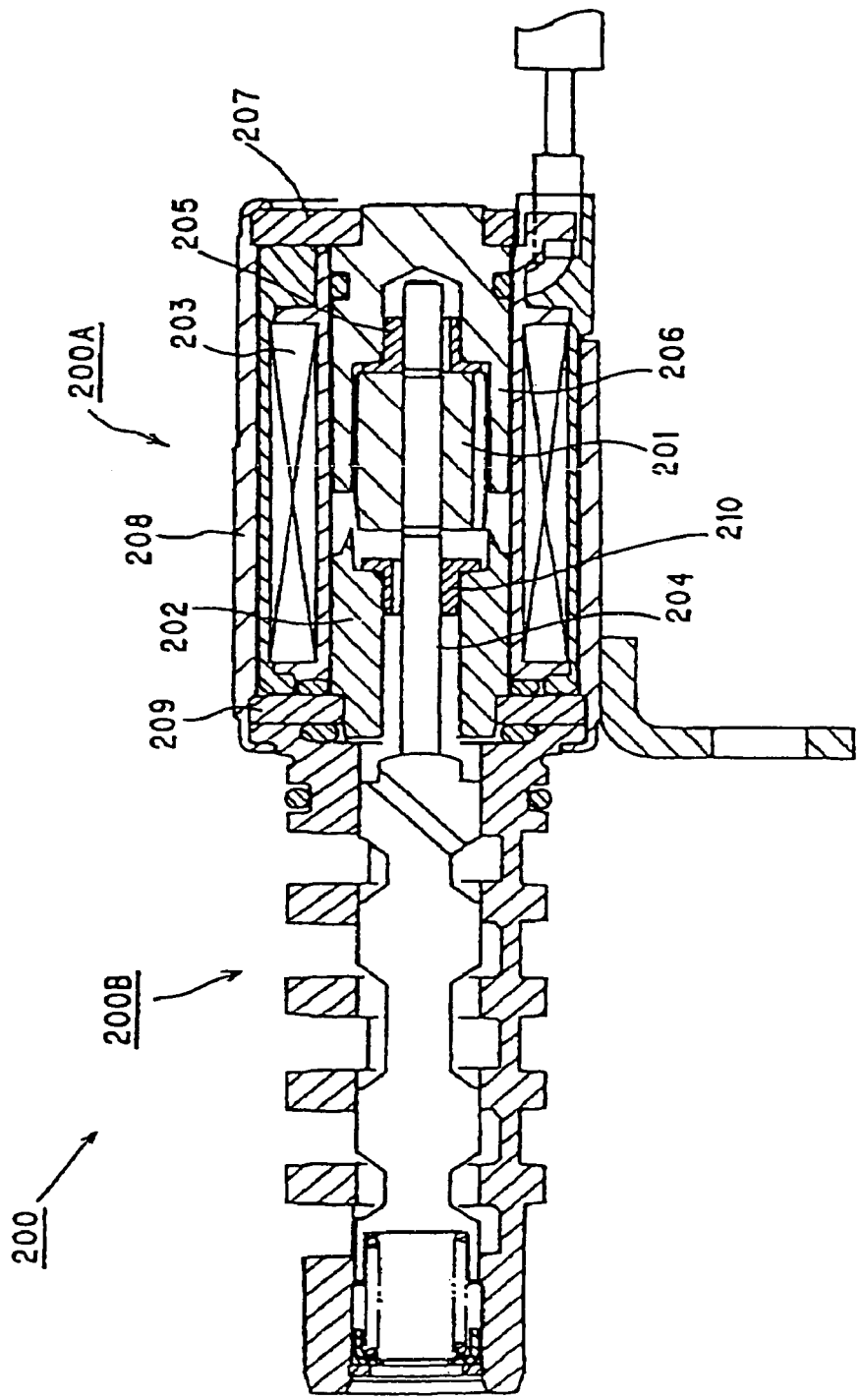
FIG. 8 is a schematic, cross sectional view showing a construction of a solenoid valve of the conventional art.

Thereby, while burr is generally generated when pressed by the ejector pin 52, the bottom surface of the recess 1$c$ serves as a portion being pressed in the embodiment, so that burr B1 and burr B2 are generated only in the recess as shown in an enlarged view (P) in FIG. 6, and so have no influence on an entire length of the plunger 1.

Accordingly, an entire length of an plunger must be strictly controlled in the case where a stroke of the plunger has an influence on control of a solenoid valve, and so it is normally necessary to implement a cutting process for the deburring process in the case where burr has an influence. Since burr has no influence on an entire length of a plunger in the embodiment, such processing step is dispensed with.

(Second Embodiment)

An explanation will be given to a solenoid valve according to a second embodiment of the invention with reference to FIG. 5. Since the solenoid valve according to the second embodiment of the invention is different only in the constitution of a plunger from the first embodiment, a detailed explanation will be given only to a plunger and an explanation for other constitution is omitted.

FIG. 5 is a schematic, cross sectional view as cut in a direction perpendicular to an axis of a plunger according to the second embodiment of the invention. In addition, the cross sectional view as cut through the axis of the plunger according to the embodiment is similar to FIG. 2(A) illustrated in the embodiment. Accordingly, FIG. 5 is a view corresponding to the BB cross section in FIG. 2(A).

A large diameter portion 1'$a$ of the plunger according to the embodiment, which constitutes a portion sliding relative to the sleeve 4, has an outer peripheral shape of polygon (regular nonagon in the example shown) in cross section perpendicular to an axial direction.

A distance between an axis and a corner 1'$d$ is set to be smaller by a clearance than the inner periphery of the sleeve 4. Accordingly, the corners 1'$d$ are disposed to be able to slide on the inner peripheral surface of the sleeve 4.

And flow passages are defined between planar surface portions 1'$e$ between the corners 1'$d$ and the inner peripheral surface of the sleeve 4.

The plunger is structured in the above manner, whereby a very unstable sliding only at one point in a cross section perpendicular to an axis is not actually effected in the same manner as in the first embodiment, and the adjacent corners 1'$d$ perform sliding while contacting at two points.

Accordingly, load is dispersed as compared with the case of contact at one point in a cross section perpendicular to an axis as in the conventional art, and a burden of load on the sliding portions is reduced, so that a property of sliding abrasion is improved.

Also, since the corners 1'$d$ slide on the inner peripheral wall surface of the sleeve 4 in the embodiment, a fluid easily flows onto the sliding portions from flow passages formed between the planar surface portions 1'$e$ and the inner peripheral surface of the sleeve 4 to make lubrication excellent as compared with the conventional art, thus improving the sliding property.

Further, the corners 1'$d$ are configured to slide on the inner peripheral wall surface of the sleeve 4 and so gaps in the vicinity of the sliding portions are large as compared with the conventional art, so that even when foreign matters enter in the vicinity of the sliding portions, foreign matters easily escape into the flow passages, thus enabling preventing that degradation in the sliding property, which is caused by the foreign matters.

In this manner, the plunger is improved in sliding property, so that fluid controllability such as hydraulic control, or the like, is improved.

Also, the cross section assumes a substantially regular polygon and the polygon has an odd number of vertices (substantially regular nonagon in the example shown), whereby the corners 1'$d$ and the planar surface portions 1'$e$ are disposed in a positional relationship that is symmetrical with respect to an axis.

Accordingly, the plunger 1 slides with the adjacent corners 1'$d$ making contact at two points and so an outer peripheral surface opposed to the planar surface portions 1'$e$ in a middle position between the two points with an axis therebetween is made furtherest from the inner periphery of the sleeve, so that the portions are made the corners 1'$d$ whereby there is produced an effect of making the gaps as small as possible to suppress backlash.

Also, it is desired that the corners 1'd assume a R-shape, and R must be appropriate since abrasion is increased when R is made too small.

Subsequently, a detailed explanation will be given to the flow passages defined between the planar surface portions 1'e and the inner peripheral surface of the sleeve 4.

Since a magnetic path is formed between the outer peripheral surface of the plunger and the inner peripheral surface of the sleeve 4, it is desired that spacings between the planar surface portions 1'e and the inner peripheral surface of the sleeve 4 be as small as possible taking account of a need for eliminating hindrance in feeding of magnetic flux.

Meanwhile, in order to provide a good sliding property, it is desired that the flow passages be as large as possible in cross sectional area so that a fluid (oil) is adequate in lubrication and adherence of the oil is not generated.

Also, dimensions and a shape are desirable, which prevents impurities contained in a fluid flowing through the flow passages from being caught.

For example, in the case where a filter for removal of impurities contained in a fluid is installed in a flow passage for introducing the fluid into the solenoid valve 100, only impurities smaller than a mesh of the filter are contained in the fluid flowing into the solenoid valve 100. Accordingly, dimensions and a shape of a cross section of the flow passages perpendicular to an axis are made to cover dimensions and a shape of the mesh of the filter whereby it is possible to prevent impurities from being caught and plugged in the flow passages.

In view of the above points, there is a need of setting dimensions and a shape of the flow passages. In addition, since the cross sectional shape assumes a regular polygon in the embodiment, dimensions and a shape of the flow passages are mainly determined depending upon which regular polygon is adopted, and a R-dimension of the corners.

Also, it is desired that the plunger in the embodiment be formed by drawing. Thereby, there is produced an advantage that the slitting work or the like as in the conventional art is dispensed with.

Also, it is possible to form the plunger by the cutting work. Here, in the case where the cutting work is carried out, chucking must be performed for fixation of the plunger, and the planar surface portions 1'e must be fixed so as not to cause scratch on the corners 1'd, which constitute the sliding portions, due to chucking.

Here, since three-point chucking (three pawls in 120-degree directions) is suited to accurate processing, the cross section perpendicular to the axis must assume an outer peripheral shape of a polygon (regular polygon) having vertices in number of a multiple of 3.

As described above, it is necessary to take into consideration that the cross section of the plunger perpendicular to the axis should assume an outer peripheral shape of a polygon having an odd number of vertices in terms of prevention of backlash, the flow passages should be made appropriate in magnitude of a cross sectional area in terms of feeding of magnetic flux and lubrication, and a regular polygon having vertices in number of a multiple of 3 should be adopted in terms of the cutting work.

In view of these points, it is optimum to adopt a substantially nonagon.

Also, while the above condition necessarily determines a set range of R in the corners 1'd, abrasion is increased when R is made too small, and so it is desired that R be set to be maximum in a range meeting the above condition.

INDUSTRIAL APPLICABILITY

As described above, the invention provides the plurality of convex surface portions and the plurality of groove portions on the outer periphery of the plunger, so that since the plunger slides relative to the inner peripheral surface of the sleeve at two points in a cross section perpendicular to the axis, a burden of load on the sliding portions is reduced and a property of sliding abrasion and the control characteristics is improved.

Also, since the curved surfaces having a smaller radius of curvature than the diameter of the inner peripheral surface of the sleeve slide, gaps in the vicinity of the sliding portions can be made comparatively large to make entry of a fluid easy to provide a good lubrication, and since foreign matters easily escape into the flow passages when foreign matters enter, the sliding property is improved and the control characteristics is improved.

When the convex surface portions are distributed equally in a circumferential direction and provided in an odd number of locations, it is possible to suppress backlash.

When dimensions and a shape of a cross section of the flow passages, which are defined between the grooves and the inner peripheral wall surface, perpendicular to an axis are set to cover dimensions and a shape of a mesh of the filter for removal of impurities contained in a fluid, it is possible to maintain a stable sliding property without plugging of impurities in the flow passages.

When a recess inwardly recessed is provided on the end surface of the plunger on an opposite side in a direction of pressurization at the time of die forging and the bottom surface of the recess is made a portion being pressed by an ejector pin so that the plunger body is taken out of the forging die after the die forging, burr has no influence on an entire length of a plunger even when burr is generated by the ejector pin, and a stable control is enabled without the need of the cutting process.

Also, even in the case where an outer peripheral shape of a cross section of the plunger perpendicular to the axis is made a polygon, the plunger slides relative to the inner peripheral surface of the sleeve at two points in a cross section perpendicular to the axis, so that a burden of load on the sliding portions is reduced to improve a property of sliding abrasion and the control characteristics is improved.

Also, since sliding is effected at the corners, gaps in the vicinity of the sliding portions can be made comparatively large to make entry of a fluid easy to provide a good lubrication, and since foreign matters easily escape into the flow passages when foreign matters enter, the sliding property is improved and the control characteristics is improved.

When the outer peripheral shape assumes a substantially nonagon, the corners and the planar surface portions are put in a positional relationship that is symmetrical with respect to an axis, so that it is possible to reduce backlash and to set the flow passages to an appropriate magnitude in cross sectional area, and it is possible to effect three-point chucking in the case of the cutting work.

When dimensions and a shape of a cross section of the flow passages, which are defined by the planar surface portions on the outer periphery of the plunger and the inner peripheral wall surface of the sleeve, perpendicular to an axis are set to cover dimensions and a shape of a mesh of the filter for removal of impurities contained in a fluid, it is possible to maintain a stable sliding property without plugging of impurities in the flow passages.

What is claimed is:

1. A solenoid valve comprising
a plunger for reciprocation by means of magnetic forces produced by excitation means, and
a sleeve slidably supporting an outer periphery of the plunger to bear the plunger, and
wherein the sleeve is provided with an inner peripheral wall surface for the bearing, a cross section of the inner peripheral wall surface being perpendicular to an axis is circular-shaped, and
the plunger sliding on the inner peripheral wall surface has an outer peripheral shape of a regular polygon having five or more odd number of vertices in cross section perpendicular to an axial direction.

2. The solenoid valve according to claim 1, wherein the outer peripheral shape is a substantially nonagon.

* * * * *